United States Patent [19]

Netznik

[11] Patent Number: 4,524,988
[45] Date of Patent: Jun. 25, 1985

[54] UPRIGHT BICYCLE FOR HANDICAPPED

[76] Inventor: Frederick P. Netznik, 8556 Central Park Ave., Skokie, Ill. 60076

[21] Appl. No.: 493,929

[22] Filed: May 12, 1983

[51] Int. Cl.³ ............................................. B62K 3/16
[52] U.S. Cl. .............................. 280/208; 280/242 R; 297/5
[58] Field of Search .......... 280/208, 242 R, 242 WC, 280/289 WC, 289 R; 297/5, 6, DIG. 4

[56] References Cited

U.S. PATENT DOCUMENTS

| | | | |
|---|---|---|---|
| 663,295 | 12/1900 | Neubert | 280/242 R |
| 2,165,700 | 7/1939 | Glynn | 297/6 |
| 3,249,368 | 5/1966 | Ginzburg | 280/242 WC |
| 3,405,954 | 10/1968 | Wolfe | 297/5 |
| 3,953,054 | 4/1976 | Udden et al. | 280/242 WC |
| 4,111,445 | 9/1978 | Haibeck | 297/5 |
| 4,342,465 | 8/1982 | Stillings | 297/5 |
| 4,390,076 | 6/1983 | Wier et al. | 280/242 WC |

OTHER PUBLICATIONS

*General Medical Physical Therapy Catalog* undated, pp. 112 and 114.

Primary Examiner—Joseph F. Peters, Jr.
Assistant Examiner—Kenneth R. Rice
Attorney, Agent, or Firm—Emrich & Dithmar

[57] ABSTRACT

An upright bicycle for supporting a handicapped or infirm person in a generally vertical position while providing a self-propelled ambulatory capability is disclosed. A pyramidal-shaped frame is comprised of a plurality of generally vertical telescoping members mounted on a flat, generally horizontal platform. Two large side wheels are rotationally mounted to the frame and easily rotated by a person positioned on an aft portion of the platform. The platform is provided with foot pads on the upper surface thereof for enhanced user support, with rollers/casters provided on the lower side thereof for increased platform stability. A sternal support in combination with a removable tray is mounted to an upper portion of the frame, while to an intermediate portion thereof is mounted a strap/buttocks support adapted to extend around and encompass the lower, rear portion of the torso of the person. Positioned beneath the strap/buttocks support on the frame are a pair of concave pads for engaging and providing support for the lower legs of the person. Hand-operated, positive locking brakes are mounted on each side of the frame for firmly engaging a respective one of the two large side wheels with a minimal amount of effort. All of the aforementioned support elements are adjustable, as is the telescoping frame itself, to accommodate user growth or a number of different persons of various sizes. In addition, side wheel size may be changed by changing only a minimal number of frame components.

22 Claims, 5 Drawing Figures

UPRIGHT BICYCLE FOR HANDICAPPED

BACKGROUND OF THE INVENTION

This invention relates in general to ambulatory devices for the handicapped or infirm and is particularly directed to a manually operated bicycle for stably supporting a handicapped or infirm person in a generally vertical orientation.

For many years now the wheelchair has been a great aid to the handicapped and/or injured. The portability, maneuverability and adaptability of wheelchairs has greatly improved the condition of those who depend upon them. Still, there are situations where the wheelchair has its limitations. For example, one confined entirely to a wheelchair runs the danger of suffering damage to surface tissue due to the prolonged application of pressure, commonly known as "bed sores". This can be avoided by the continual, regular shifting of one's weight to more evenly distribute this pressure. However, where the sensitivity of the affected area has been reduced or is no longer present, then a regular routine of position changing must be undertaken.

Various other problems arise due to such confinement. For example, the bladder has difficulty in draining properly and the bowel performs its functions only with great difficulty when one is restricted to the sitting position for extended periods of time. In addition, proper displacement between the abdominal organs and the diaphragm is frequently not maintained leading to respiratory difficulties. The absence of any exertion or activity by the legs makes the lower limbs of one confined to a wheelchair more susceptible to osteoporosis and contracture deformity.

In children additional difficulties are frequently encountered. Confinement to a wheelchair can frequently interfere with not only the physical development of unaffected portions of the child's body, but also with his or her normal emotional development. The sedentary nature of confinement to a wheelchair tends to stifle inquisitiveness, intellectual curiosity and general mental development, in many cases. The general uplift experienced in standing and moving about after a long period of sitting is well known to all who are fortunate enough to be able to stand and move about. In addition, we all seek to be treated on equal terms with others and being forced to meet and discuss in a sitting position with others who are standing tends to result in a general feeling of being in an unequal position and perhaps one of inferiority. Thus, a device which would permit a handicapped person to maintain a generally upright, or erect, posture while providing him or her with a self-propelled means of transport would be of great physical and psychological benefit to those able to take advantage of such a device. A device of this nature would ideally be sturdily constructed, adjustable to accommodate growth particularly when used by a child, provide comfortable and stable support even for one completely incapable of lower extremity control, and provide an easy and safe means of locomotion.

SUMMARY OF THE INVENTION

Accordingly, it is an object of the present invention to provide a safe and stable means of locomotion for a handicapped or infirm person while firmly supported in a generally upright position.

The present invention contemplates an upright bicycle having a pyramidal-shaped telescoping frame supported by a horizontal platform upon which the user is supported in a generally vertical orientation. A large wheel is mounted on each side of the frame and may be manually rotated by the user for propelling the bicycle. The platform is stabilized by forward rollers and aft casters positioned on its underside and includes a pair of fixed adjustable footholds secured on its upper surface for engaging the feet of a user. Mounted to an aft portion of the frame are a pair of lower leg supports and, immediately above these supports, a buttocks support strap which extends around the user and provides vertical and horizontal support. Securely mounted to an upper portion of the frame is a sternum support pad against which the user may lean thus freeing his or her arms and hands for rotational displacement of the side wheels or for operating frame-mounted brake mechanisms located within easy reach on each side of the frame and capable of securely engaging a respective side wheel. A support tray may be easily attached to a forward portion of the sternum support pad to support an object, such as a book, in a convenient location with respect to the user.

The telescoping frame is easily adjustable in height as are all support elements mounted to the frame. The upright bicycle of the present invention may thus be adapted to accommodate a growing child or numerous users of widely varying physical sizes. In addition, the large side wheels may be replaced by wheels of a different size with only a minimal modification of the frame. The present invention thus not only provides for the safe, easy, self-propelled transport of one who is handicapped, but also provides a structure capable of supporting that handicapped person in a generally upright orientation permitting that person to not only partake in various heretofore inaccessible activities, but to also derive the therapeutic benefits of vertical positioning.

BRIEF DESCRIPTION OF THE DRAWINGS

The appended claims set forth those novel features believed characteristic of the invention. However, the invention itself as well as further objects and advantages thereof, will best be understood by reference to the following detailed description of a preferred embodiment taken in conjunction with the accompanying drawings, wherein like numerals designate the same elements throughout the various figures, in which:

DESCRIPTION OF THE PREFERRED EMBODIMENTS

Figure 1:
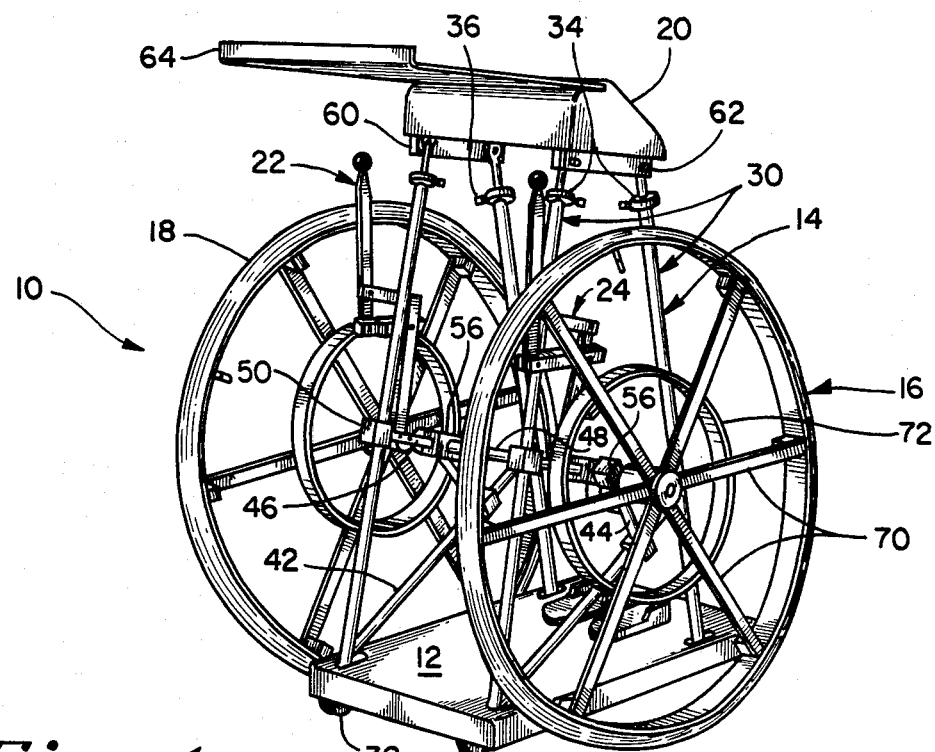
FIG. 1 is a front lateral perspective view of an upright bicycle for a handicapped or infirm person in accordance with the present invention.

Referring to FIG. 1, there is shown a front lateral perspective view of an upright bicycle 10 in accordance with the present invention. The upright bicycle 10 includes a lower, generally horizontal platform 12 which supports an upright, generally pyramidal frame 14 extending upward therefrom. The rearward portion of the upright bicycle 10 as shown in FIG. 1 is generally on the right in the figure. Viewing the upright bicycle 10 from the rear, it includes left and right wheels 16, 18 rotationally mounted on each end of an axle 48 which, in turn, is securely mounted to the upright frame 14. Securely mounted to an upper portion of the upright frame 14 is a sternal support 20. Right and left manually operated brake mechanisms 22, 24 are mounted to respective right and left hand portions of the upright frame 14 immediately adjacent the right and left wheels 18, 16.

A person using the upright bicycle 10 of the present invention is positioned on an aft portion of the horizontal platform 12, just to the rear of the upright frame 14, and leans forward against the sternal support 20. The upright frame 14 includes a plurality of adjustable, telescoping members 30 for fixing the height of the sternal support 20 above the platform 12 as desired. this adjustment will, of course, depend upon the height of the person using the upright bicycle and should be such that the sternal support 20 is in contact with a forward, upper portion of the user's torso. The hands of a person thus positioned will be located immediately adjacent an upper portion of a respective wheel permitting the person to manually rotate the wheels in moving the upright bicycle 10. In addition, the hand brake mechanisms are within the easy grasp of a person thus positioned on the upright bicycle 10. A detailed description of the structure and configuration of the upright bicycle 10, including the operation of the hand brake mechanisms, is provided in the following paragraphs.

Figure 4:
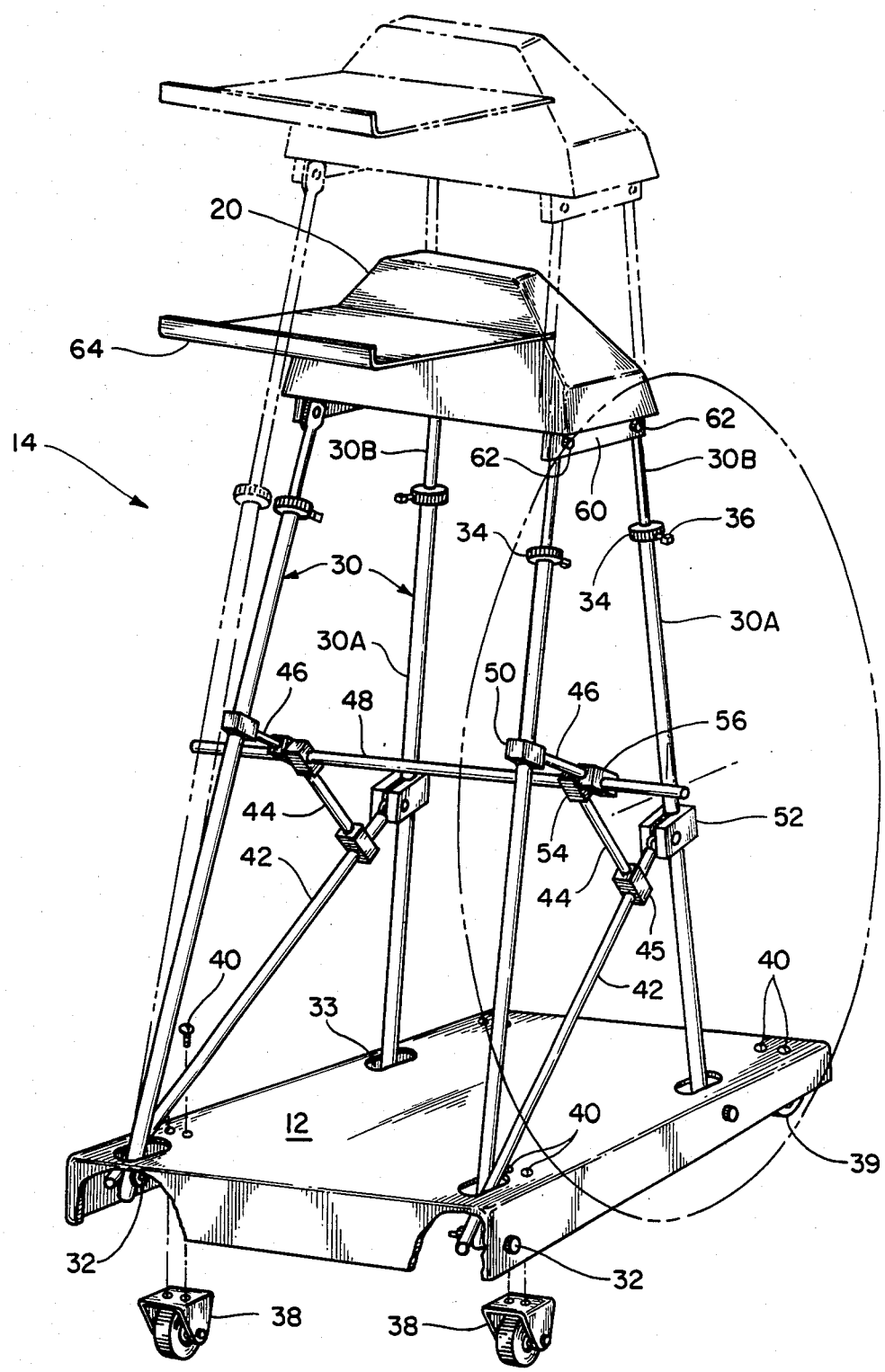
FIG. 4 is a front, lateral perspective view of the frame of the upright bicycle illustrating in dotted line form the adjustability of the upright bicycle for accommodating users of various size.

Referring to FIG. 1 as well as to FIG. 4, which is a partially cut away perspective view of the upright frame 14, the structure and configurarion of the upright bicycle will now be described in greater detail. The upright frame 14 is comprised of four telescoping, generally upright members 30 each pivotally mounted to the platform 12 by means of a connecting pin combination 32. As used throughout the present description, a connecting pin, or connecting pin combination, refers to a conventional means for coupling elements such as a nut and bolt combination, a screw, etc. Because the present invention contemplates the use of such conventional coupling means, connecting elements are generally referred to as connecting pins which is intended to encompass those means for connecting structural elements well known to those skilled in the art. As shown in FIGS. 1 and 4, each telescoping upright member 30 is positioned within a respective slot 33 in the upper surface of platform 12. As shown in the cutaway portions of platform 12, each telescoping upright member 30 is free to pivot with respect to platform 12. This permits the upright frame 14 to be extended or lowered, as desired. This is accomplished by means of the several components of each telescoping upright member 30. Each telescoping upright member 30 is comprised of a lower element 30A, an upper element 30B, and a tube clamp collar 34 including a clamp screw 36 inserted therein. The tube clamp collar 34 is positioned at the upper end of the lower element 30A of the telescoping upright member 30. The diameter of the upper element 30B is less than that of the lower element 30A of each telescoping upright member 30, permitting the upper element 30B to be displaced along and within a respective lower element 30A. When the upper element 30B is extended to the desired length, the clamp screw 36 in the tube clamp collar 34 positioned on the respective lower element 30A is tightened for securely engaging the upper element 30B and maintaining its position within lower element 30A. Because the upper portion of each upper element 30B of the telescoping upright members 30 is coupled by means of a connecting pin 62 to a mounting rib 60 on the lower surface of the sternal support 20, when the telescoping upright members 30 are extended each telescoping upright member 30 will pivot about the connecting pin 32 which couples it to the platform 12. Thus, the telescoping nature of the upright members 30 as well as the pivotal coupling of each telescoping upright member 30 to platform 12 permits the height of the upright frame 14 to be easily adjusted to accommodate a wide range of user sizes. The upright frame 14 is shown in an extended, or upraised, configuration by broken lines in FIG. 4.

To the lower surface of platform 12 are mounted a plurality of non-pivoting roller assemblies 38 and swiveling caster assemblies 39 by means of mounting pins 40. In a preferred embodiment, two roller assemblies 38 are positioned on a forward section of the lower portion of platform 12, while two caster assemblies are positioned on an aft section of the lower portion of platform 12. These roller and caster assemblies 38, 39 engage the surface upon which the upright bicycle 10 is positioned and maintain platform 12 in a generally horizontal orientation for increased user stability while permitting the platform 12 to easily be displaced over the surface. A user standing aft of upright frame 14 is positioned upon platform 12 so as to lean slightly forward against the sternal support 20. This increases user stability and decreases the possibility of a rearward fall by the user. Thus, in a preferred embodiment, the upper surface of platform 12 is angled upward from rear to front for increased upright bicycle stability. The upward tilt of platform 12 thus compensates for the forward leaning of the upright bicycle's user for increased bicycle and user stability. Also in a preferred embodiment, the forward roller assemblies 38 are positioned on the underside of platform 12 so as to be displaced slightly upward from the surface upon which the upright bicycle is positioned. The thus elevated forward roller assemblies are thus able to accommodate obstructions on and elevations in the surface upon which the upright bicycle moves. The upraised position of the forward roller assemblies permit it to more easily roll over such obstructions and elevations.

The configuration of upright frame 14 will now be explained primarily in terms of the left hand portion of the apparatus shown in FIG. 4, with the following discussion equally applicable to the right hand portion thereof. The upright frame 14 includes right and left lower gussets 42 which are pivotally coupled, in combination with a respective forward telescoping upright member 30, to a forward portion of platform 12 via a connecting pin 32. The other end of each lower gusset 42 is coupled by means of a respective rear bracket 52 to an intermediate portion of a lower element 30A of a respective rear telescoping upright meber 30. Similarly, upper gussets 44 are located on the right and left hand portions of the upright frame 14 and are coupled at one end to a lower gusset 42 by means of a gusset mounting bracket 45, and at the other end to the axle 48 by means of an inner axle bracket 54. Finally, right and left forward gussets 46 couple the axle 48 to a respective forward telescoping upright member 30 by means of a forward bracket 50 and an outer axle bracket 56.

Lower gusset 42 is inserted through an aperture within gusset mounting bracket 45 which is free to slide along the lower gusset. Similarly, forward and rear brackets 50, 52 are free to slide along the respective telescoping upright member 30 upon which they are positioned. By thus engaging the various upright members 30 and lower gussets 42 in a semi-rigid, sliding manner, the thus displaceable brackets provide for flexibility in the upright frame 14 permitting each of the telescoping upright members 30 to be displaced relative to one another in adjusting the height of the upright frame 14 as desired. Thus, the unique arrangement of the various brackets which are free to slide along the various structural members upon which they are mounted provides for a certain, limited degree of displacement in adjusting the height of the upright frame 14, while providing a rigid support structure once the height of the frame is fixed as desired. Finally, left and right wheels 16, 18 are rotationally mounted to the respective ends of axle 48 by means of conventional bearing assemblies (not shown).

As described above, the upper portion 30B of each telescoping upright member 30 of the upright frame 14 is coupled by means of a connecting pin 62 to a respective right and left mounting rib 60 positioned on a lower portion of sternal support 20. Sternal support 20 in a preferred embodiment is comprised of a urethane foam. In addition, a horizontal support member 64, or tray, may be mounted in a conventional manner to a forward portion of the sternal support 20. A horizontal support member 64 thus mounted is positioned immediately forward of the user and may be utilized by a user for the convenient positioning of an object. For example, horizontal support member 64 may be used to write on, eat off of, support a book, or for virtually any imaginable use for which such a support element could be utilized. In addition, horizontal support member 64 may be comprised of a transparent material, such as a transparent plastic, so as not to restrict the visibility of a user, particularly when the upright bicycle is displaced in a forward direction.

As stated above and as shown in FIG. 1, the upright bicycle 10 includes right and left hand brakes 22, 24. The left hand brake 24 of FIG. 1 is shown in greater detail in FIG. 2, as viewed from right to left with respect to the rear of the upright bicycle 10 as shown in FIG. 1. The right hand brake 22 is symmetrically identical to the left hand brake and, therefore, the following detailed description of the structure and operation of the left hand brake 24 is equally applicable to the right hand brake 22.

As previously explained, a forward gusset 46 is coupled between the axle 48 and a forward telescoping upright member 30 by means of an outer axle bracket 56 and a forward bracket 50 positioned on respective ends of the forward gusset 46. This is shown for the right and left hand portions of the upright frame 14 in FIG. 1. Similarly, forward gusset 46 is shown in the lower portion of FIG. 2, but its coupling to the axle via an axle mounting bracket is not shown therein for simplicity sake. The lower portion of a first fixed mounting bracket 80 is rigidly coupled to a respective forward gusset 46 by means of connecting pins 78. An upper portion of the first fixed mounting bracket 80 is coupled to an aft portion of a second fixed mounting bracket 82 by means of connecting pins 86. A forward portion of the second fixed mounting bracket 82 is pivotally coupled by means of pivot pin 88 to an intermediate portion of pivoting brake handle 90. To the upper portion of the pivoting brake handle 90 is mounted a grip 92 which is grasped by a user in manually operating the hand brake. The lower portion of the pivoting brake handle 90 is coupled to a forward portion of a coupling bracket 94 by means of a cam block 104. The cam block 104 is secured to the forward portion of coupling bracket 94 by means of connecting pins 102, while an extension shaft 106 attached to and extending from facing surfaces of the lower portion of pivoting brake handle 90 is positioned within cam curve 108. As explained, the first fixed mounting bracket 80 is pivotally coupled to coupling bracket 94 by means of pivot pin 84. Securely mounted to an aft portion of coupling bracket 94 is an L-shaped bracket 98 by means of connecting pin 96. Securely positioned on the upper surface of L-shaped bracket 98 is a brake pad 100 for engaging the inner surface of the inner rim 72 of the left wheel 16. The left wheel 16, as well as the right wheel 18, includes a plurality of spokes 70 radiating outwardly from the center of the wheel and coupled to the inner rim 72 by means of a connecting pin 74.

Figure 2:
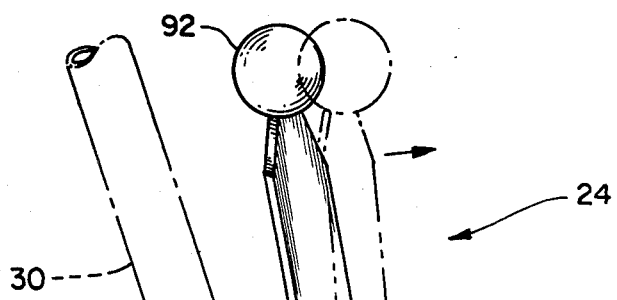
FIG. 2 is a perspective view of a portion of FIG. 1 showing the configuration and operation (in dotted line form) of the brake mechanism of the upright bicycle.
Figure 2:
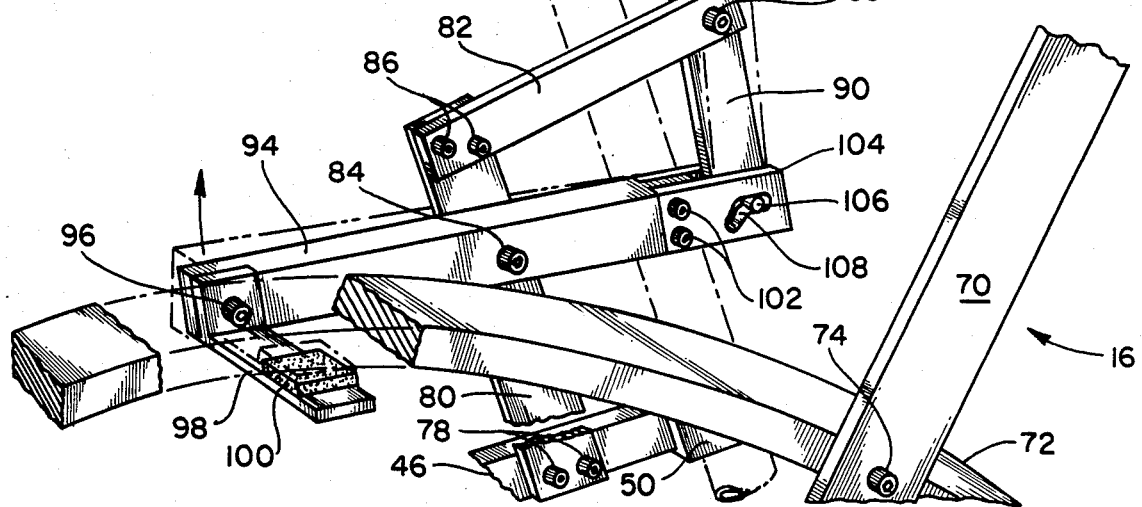

The position of the various hand brake components when the hand brake is applied in engaging a respective wheel is shown in FIG. 2 in dotted line form. When the upper portion of the pivoting brake handle 90 to which grip 92 is attached is moved from left to right as shown in FIG. 2, the pivoting brake handle 90 pivots about pivot pin 88. This causes the lower portion of pivoting brake handle 90 which is attached to cam block 104 by means of extension shaft 106 inserted therein, to be displaced leftward. The leftward displacement of the lower portion of pivoting brake handle 90 causes the forward portion of coupling bracket 94, and cam block 104 mounted thereto, to be displaced downward by the action of the extension shaft 106 on the inner surface of the cam curve 108 located within cam block 104. The downward displacement of cam block 104 causes coupling bracket 94 to pivot about pivot pin 84. This results in an upward displacement of the aft portion of coupling bracket 94 to which L-shaped bracket 98 is securely mounted. The upward displacement of L-shaped bracket 98 causes the brake pad 100 to engage the inner surface of the wheel's inner rim 72 in applying a retarding force on the rotation of the wheel 16. Brake pad 100 is preferably comprised of a high friction, rubber-like material for improved braking action. Thus, the forward displacement of the upper portion of pivoting brake handle 90 results in the upward displacement of L-shaped bracket 98 and brake pad 100 coupled thereto. Brake pad 100 then engages the inner surface of the wheel's inner rim 72 for effective bicycle braking. With a pair of independently actuated, hand operated brakes, the left and right wheels 16, 18 may be individually or simultaneously engaged by a respective brake mechanism.

Figure 3:
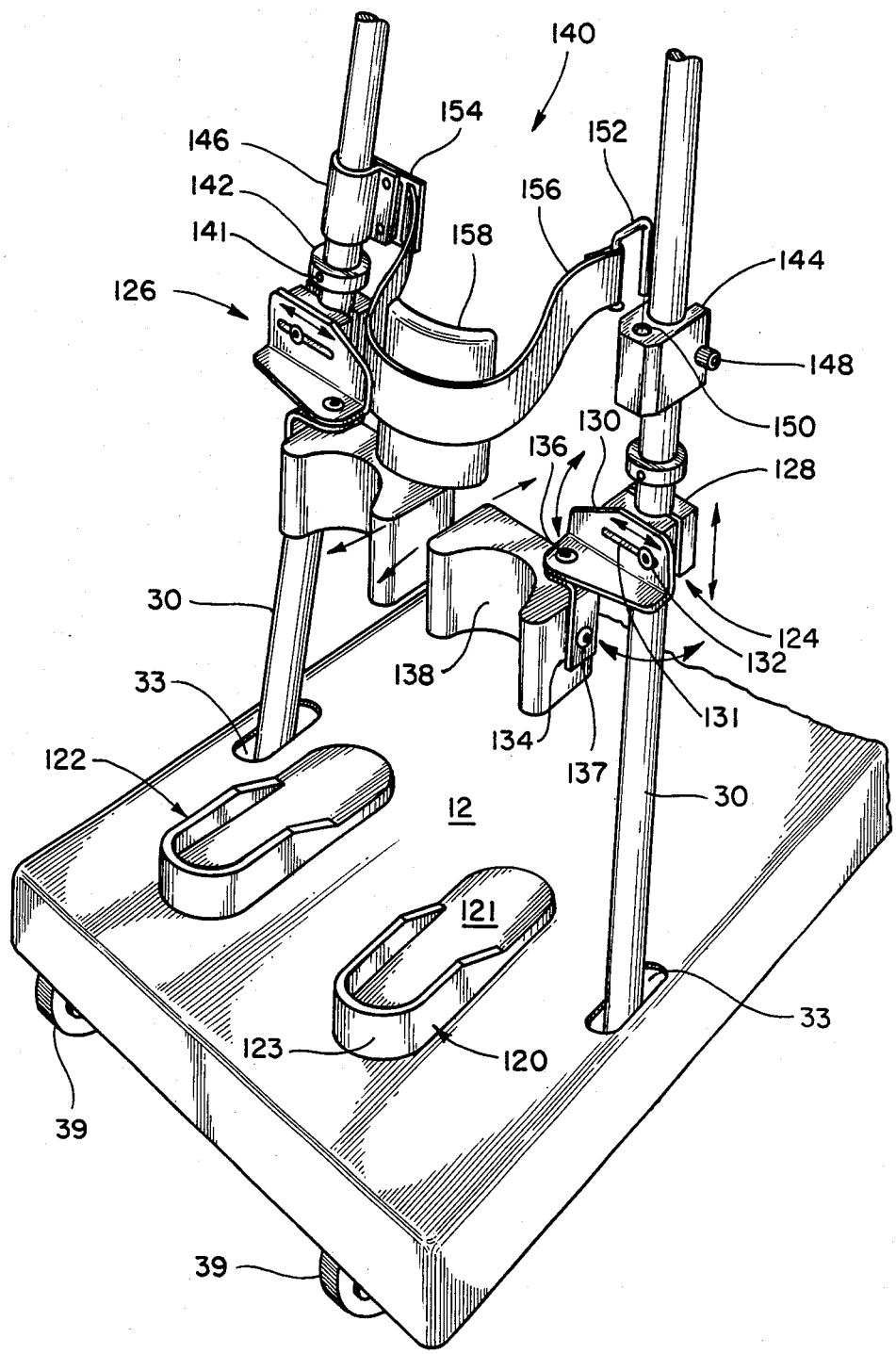
FIG. 3 is an upper, rear side view of the support platform and the lower portion of the frame members with various support elements mounted thereto.

Referring to FIG. 3, there is shown an upper, rear side perspective view of the lower frame and platform portion of the upright bicycle of the present invention. Two caster assemblies 39 are shown mounted to a lower, aft portion of platform 12 toward the respective lateral edges thereof. Securely mounted to an aft portion of the upper surface of platform 12 are right and left foot retainers 120, 122. As shown in the figure, each foot retainer includes a flat portion 121 and an upraised portion 123 extending along the aft side portions and rear portion of the respective flat portions of each foot retainer. The right and left foot retainers 120, 122 are adapted to receive and engage the feet of a bicycle user positioned upon platform 12. In a preferred embodiment, each foot retainer is comprised of a polyurethane material, to the underside of which is affixed, such as by gluing, a metal plate (not shown). The metal plate may be secured to the upper surface of platform 12 by conventional means such as by bolts. The foot retainers 120, 122 may be positioned as desired on the upper surface of platform 12 by merely placing a mounting aperture as desired thereon and inserting mounting bolts therethrough. The right and left foot retainers 120, 122 are placed slightly aft of the rearward telescoping upright members 30 so as to allow the user to lean forward slightly against the aforementioned sternal support which is not shown in FIG. 3.

Mounted to respective right and left aft telescoping upright members 30 are right and left leg support assemblies 124, 126. The following description is directed to right leg support assembly 124, but is equally applicable to the left leg support assembly 126 as shown in FIG. 3. Each leg support assembly includes a frame mounting bracket 128 mounted on a respective telescoping upright member 30 by means of a connecting pin 132. Connecting pin 132 is also used to mount a first L-shaped bracket 130 to an aft surface of the frame mounting bracket 128. The first L-shaped bracket 130 includes a generally horizontal slot 131 therein which permits the first L-shaped bracket 130 to be displaced toward or away from the other aft telescoping upright member 30. A second L-shaped bracket 134 is utilized to mount a leg support 138 to the first L-shaped bracket 130 by means of connecting pins 136, 137. A respective leg support 138 may be pivotally displaced relative to the first L-shaped bracket 130 about an axis defined by connecting pin 136. Connecting pin 136 may then be tightened when the leg support 138 is positioned as desired so as to properly engage the lower leg of a user. Each leg support 138 includes a recessed aft portion adapted to receive and engage the forward portion of the lower leg of a user such as the tibia immediately below the knee. Thus, the leg supports 138 provide stable positioning for the infirm legs of a user which are retained in a stable position with respect to forward and lateral displacement thereof. Finally, the entire right and left leg support assemblies 124, 126 may be adjusted vertically along a respective telescoping upright member 30 by loosening connecting pin 132, moving the entire assembly to the desired position along a respective telescoping upright member, and adjusting connecting pin 132 for securely coupling the frame mounting bracket 128 to the telescoping upright member 30. The three aforementioned adjustments thus permit each leg support 138 to be adjusted vertically, forward and aft, and inward and outward relative to the center of platform 12.

Figure 5:
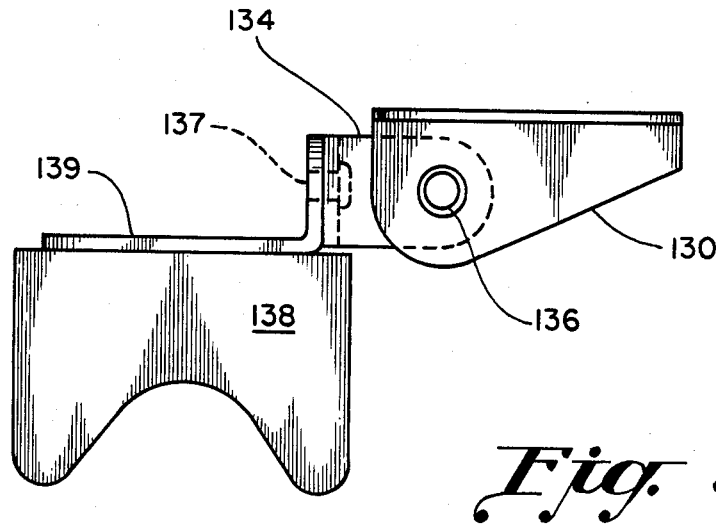
FIG. 5 is a top plan view of another embodiment of a leg support assembly and mount therefor.

Shown in FIG. 5 is a top plan view of another mounting arrangement for leg support 138. In this embodiment, a third L-shaped bracket 139 is coupled to the second L-shaped bracket 134 by means of connecting pin 137. By loosening connecting pin 137, the combination of third L-shaped bracket 139 and leg support 138 is free to pivot about the axis of connecting pin 137 and to be secured in the desired orientation. The third L-shaped bracket 139 may be securely affixed to a forward portion of a leg support 138 by conventional means such as an epoxy cement.

Positioned immediately above right and left leg support assemblies 124, 126 and mounted on a respective aft telescoping upright member 30 is a sacral support assembly 140. Sacral support assembly 140 includes right and left frame mounting brackets 144, 146 positioned on respective telescoping upright members 30. Right frame mounting bracket 144 includes a generally horizontally oriented aperture into which a mounting pin 148 is inserted. By tightening mounting pin 148, the right frame mounting bracket 144 may be securely attached to telescoping upright member 30 at the desired location thereon. An aft portion of right frame mounting bracket 144 includes a generally vertically oriented aperture 150 therein into which a belt clasp 152 may be inserted. Attached to belt clasp 152 is one end of a flexible support belt 156, the other end of which is securely engaged by belt hook 154. Belt hook 154 is adapted not only to securely engage one end of support belt 156, but is also adapted to be mounted upon a telescoping upright member 30. Belt hook 154 is thus capable of being displaced along telescoping upright member 30 and of being securely positioned thereon at a desired location by means of the combination of clamping collar 142 and clamp screw 141 positioned therein. Thus, clamping collar 142 is positioned immediately below and in contact with left frame mounting bracket 146 for the support thereof and clamp screw 141 is adjusted to firmly engage the telescoping upright member 30 for the secure positioning of the left-hand portion of the sacral support assembly 140.

Coupled to left frame mounting bracket 146 is belt hook 154 which securely engages and retains one end of support belt 156. Attached to an intermediate portion of the front surface of support belt 156 is a support pad 158. With belt clasp 152 secured to the other end of support belt 156 and inserted in aperture 150 of the right frame mounting bracket 144, support belt 156 may be positioned aft of an upright bicycle user standing on a rear portion of platform 12. The sacral support assembly 140 is intended to engage the lower aft portion of the torso of a user, i.e., the buttocks area, to prevent the rearward displacement of that person while insuring his or her secure engagement with and support by the sternal support and leg supports. By means of the combinations of right frame mounting bracket 144 and connecting pin 148 and left frame mounting bracket 146 and clamping collar 142 with clamp screw 141, the vertical position of the sacral support assembly 140 may be adjusted according to the size of the person using the upright bicycle of the present invention.

Upright frame 14 is designed to accommodate left and right wheels 16, 18 of various sizes. In order to equip upright frame 14 with larger diameter side wheels, telescoping upright members 30 of a longer length are required and upper gussets 44 must also be lengthened accordingly. All other components of the upright frame 14 may remain unchanged.

There has thus been shown an upright bicycle intended for use by a handicapped or infirm person which is capable of maintaining that person, regardless of the degree of infirmity, in a stable, generally upright position while affording that person the capability of self-propelled locomotion. The upright bicycle includes a lower stable platform upon which the person stands, a generally upright, pyramidal frame to which adjustable supports for the front, upper torso and rear, lower torso and also the legs of the user are provided. Two large side wheels are mounted to the frame in close proximity to the hands and arms of the user. Similarly, right and left hand-operated brakes are within the easy grasp of a user for engaging a respective wheel.

While particular embodiments of the present invention have been shown and described, it will be obvious to those skilled in the art that changes and modifications may be made without departing from the invention in its broader aspects. For example, while the present invention is described as including right and left leg support assemblies, these components may not be necessary, depending upon the degree of infirmity, to support a particular individual. Thus, this aspect of the invention is not considered absolutely essential for its proper operation, but merely as an additional support feature. Therefore, the aim of the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A mobile apparatus for stably maintaining an infirm person in a generally upright position and providing for the self-propelled locomotion of said person, said apparatus comprising: a platform for supporting the feed of said person, said platform adapted for displacement over a surface upon which it is positioned, and wherein a front portion of said platform is raised slightly with respect to a rear portion thereof; a frame positioned on said platform and extending upward therefrom immediately forward of the person supported thereon; first support means mounted to an upper portion of said frame immediately adjacent and in contact with an upper, front portion of the torso of said person positioned on said platform; second support means mounted to an intermediate portion of said frame and extending rearward therefrom so as to engage a lower, rear portion of the torso of said person so as to provide lateral and vertical support for said person in maintaining said person in a generally upright, stable position; and first and second wheels each rotatably mounted to facing lateral portions of said frame for supporting said frame on said surface, wherein said wheels are positioned on said frame within the reach of said person to permit their rotation by said person in providing for the self-propelled locomotion of said person.

2. An apparatus in accordance with claim 1 further including first and second hand-operated brake elements each coupled to respective facing lateral portions of said apparatus immediately adjacent a respective wheel for the selective engagement thereof.

3. An apparatus in accordance with claim 1 wherein said platform includes a plurality of roller means positioned on the lower surface thereof.

4. An apparatus in accordance with claim 3 having a plurality of fixed rollers positioned on a forward portion of the lower surface of said platform and a plurality of swiveling casters positioned on an aft portion of the lower surface of said platform.

5. An apparatus in accordance with claim 4 wherein the aft casters continuously engage said surface during normal operation and the forward rollers are maintained by said platform in a position slightly elevated from said surface in order to facilitate encounters with obstructions on said surface when said apparatus is moved forward.

6. An apparatus in accordance with claim 1 wherein said platform includes two receptacle means positioned on an aft portion of the upper surface thereof for receiving and stably positioning the feet of said person upon said platform.

7. An apparatus in accordance with claim 6 wherein said receptacle means are adjustably positioned on said platform to accommodate changing the position of said person on said platform in a stable manner.

8. An apparatus in accordance with claim 1 further comprising third support means mounted to said frame between the platform and said second support means, said third support means adapted to engage and restrict the movement of the lower legs of said person.

9. An apparatus in accordance with claim 8 wherein said third support means may be variably positioned in a generally vertical direction along said frame as desired.

10. An apparatus in accordance with claim 9 wherein said third support means includes two concave receptacles for engaging a forward portion of the respective lower legs of said person.

11. An apparatus in accordance with claim 8 wherein said third support means is adjustably positioned inwardly and outwardly relative to the lateral portions of said frame.

12. An apparatus in accordance with claim 8 wherein said third support means is adjustable forward and aft relative to said frame.

13. An apparatus in accordance with claim 1 wherein said frame is generally pyramidal in shape, wherein the bottom portion is wider than the top portion thereof.

14. An apparatus in accordance with claim 1 wherein said second support means may be selectively positioned in a generally vertical direction along said frame.

15. An apparatus in accordance with claim 1 wherein said second support means includes a flexible member secured at each end to said frame.

16. An apparatus in accordance with claim 15 wherein said second support means further includes a padded element secured to said flexible member for engaging a lower, rear portion of the torso of said person.

17. An apparatus in accordance with claim 15 wherein said flexible member comprises a strap coupled to said frame at each end thereof by means of a clasp element.

18. An apparatus in accordance with claim 1 wherein said frame includes a plurality of generally vertically telescoping members for selectively adjusting the vertical height of said apparatus.

19. An apparatus in accordance with claim 1 further including carrier means mounted to said first support means so as to extend forward therefrom for supporting an object placed thereon in a position immediately forward of said person.

20. An apparatus in accordance with claim 19 wherein said carrier means includes a flat tray element.

21. An apparatus in accordance with claim 20 wherein said flat tray element is transparent.

22. In a mobile apparatus for providing an infirm person positioned thereon a self-propelled means of transport, said apparatus including a generally upright frame with a platform coupled to a lower portion of said frame and first and second side wheels coupled to respective lateral portions of same frame, the improvement comprising: supporting said person in a generally upright, standing position upon said platform by securing upper and lower portions of said person's torso and the legs of said person to upper, intermediate and lower portions, respectively, of said frame and elevating a forward portion of the platform relative to a rear portion thereof such that with said person leaning forward against the upper portion of said frame increased stability is obtained.

* * * * *

UNITED STATES PATENT AND TRADEMARK OFFICE
CERTIFICATE OF CORRECTION

PATENT NO. : 4,524,988

DATED : June 25, 1985

INVENTOR(S) : Frederick P. Netznik

It is certified that error appears in the above—identified patent and that said Letters Patent is hereby corrected as shown below:

Column 9, line 27, change "feed" to -- feet --.

Signed and Sealed this

Fifteenth Day of October 1985

[SEAL]

Attest:

DONALD J. QUIGG

Attesting Officer

Commissioner of Patents and
Trademarks—Designate